United States Patent [19]

Okazaki

[11] Patent Number: 5,781,794
[45] Date of Patent: Jul. 14, 1998

[54] DATA PROCESSING SYSTEM HAVING AN ADDITION UNIT FOR PREPARING NEW CONTROL TABLES FOR NEW HARDWARE MODULES AND DYNAMICALLY ADDING THE TABLES TO THE PRESENT CONTROL TABLES

[75] Inventor: Kotaro Okazaki, Kawasaki, Japan

[73] Assignee: Fujitsu Limited, Kawasaki, Japan

[21] Appl. No.: 309,031

[22] Filed: Sep. 20, 1994

[30] Foreign Application Priority Data

Dec. 1, 1993 [JP] Japan ................................. 5-301637

[51] Int. Cl.⁶ .................................................. G06F 13/00
[52] U.S. Cl. ...................... 395/822; 395/653; 395/830; 395/839; 395/861
[58] Field of Search ........................... 395/200.01, 700, 395/860, 283, 500, 867, 653, 822, 830, 839, 861; 361/58; 354/514 B; 370/62

[56] References Cited

U.S. PATENT DOCUMENTS

| | | | |
|---|---|---|---|
| 4,484,275 | 11/1984 | Katzman et al. | 395/860 |
| 4,768,149 | 8/1988 | Konopik et al. | 395/867 |
| 4,814,970 | 3/1989 | Barbagelata et al. | 395/200.01 |
| 4,999,787 | 3/1991 | McNally et al. | 364/514 B |
| 5,113,522 | 5/1992 | Dinwiddie, Jr. et al. | 395/700 |
| 5,157,771 | 10/1992 | Losi et al. | 395/283 |
| 5,195,086 | 3/1993 | Baumgartner et al. | 370/62 |
| 5,210,855 | 5/1993 | Bartol | 395/500 |
| 5,272,584 | 12/1993 | Austruy et al. | 361/58 |
| 5,386,567 | 1/1995 | Lien et al. | 395/700 |
| 5,454,080 | 9/1995 | Fasig et al. | 395/283 |
| 5,517,635 | 5/1996 | Cross et al. | 395/500 |

*Primary Examiner*—Thomas C. Lee
*Assistant Examiner*—Po C. Huang

[57] ABSTRACT

In a data processing system formed by one or more kinds of hardware modules each connected through a system bus, and additional hardware modules being added by connecting a frame containing one or more hardware modules to be added in accordance with request of a user, each of the processor modules includes: a detection unit for detecting a request of addition of the frame containing the hardware modules to be added; a specifying unit operatively connected to the detection unit for specifying a structure of hardware modules to be added when detecting the request; an addition unit operatively connected to the specifying unit for preparing new control tables for the hardware modules to be added based on the structure information in the specifying unit, and dynamically adding the new control tables to the present control tables which are already provided for the present hardware modules; and an initializing unit operatively connected to the specifying unit for initializing the hardware modules to be added.

10 Claims, 8 Drawing Sheets

Fig.5C (COUPLED)

DATA PROCESSING SYSTEM HAVING AN ADDITION UNIT FOR PREPARING NEW CONTROL TABLES FOR NEW HARDWARE MODULES AND DYNAMICALLY ADDING THE TABLES TO THE PRESENT CONTROL TABLES

BACKGROUND OF THE INVENTION

1. Field of the Invention

The present invention relates to a data processing system with a function of dynamic expansion, and particularly, it relates to a data processing system which can dynamically change in size by adding hardware modules thereto in accordance with a request from a user without interrupting operation (i.e., dynamic expansion) of the system.

2. Description of the Related Art

In general, a data processing system is formed by a plurality of hardware modules, such as processors modules, networks, LANs (local area networks), magnetic tape apparatuses, magnetic disk apparatuses, etc. A user may request in change of the size of the system, i.e., addition of hardware modules, after setting up of the system, as an expansion of the customer service. When such an expansion is requested by a user, it is necessary to expand the system without interrupting operation because services such as cash dispensers must be operated at all times.

Usually, a processor module includes one or more control tables to manage the connection of hardware modules. That is, the control tables are used to manage structural information which indicates whether hardware modules in the system are in use or not. As explained below, this use status of the hardware modules is always listed in the control tables.

The user can learn the size of the present data processing system by checking hardware modules provided in the system when it starts an IPL (initial program loading) operation. Further, the user confirms the use state of hardware modules which developed on the control tables. In general, hardware modules to be added to the system are contained in a frame which can provide a plurality of hardware modules therein, and this frame is coupled to the system when the system is expanded.

Since the number of hardware modules which can be contained within the frame can be known in advance, and since the use state of the present hardware modules is already known from the control tables, it is possible to easily develop structural information on the hardware modules to be added and to add hardware modules, without interrupting the operation of the system.

However, in the above conventional art, since the control tables are not prepared for the addition or hardware modules in excess of the number that can be accommodated in the above frame, it is necessary to stop the system once in order to prepare new control tables. After stopping the operation of the system, a new frame is added to the current frame, and hardware modules to be added are provided in the new frame. After completion of the above steps, the IPL operation of the hardware modules is repeated again from the first step.

As explained above, there is a problem when adding hardware modules in excess of the number of hardware modules which can be contained within the existing frame because it is necessary to stop the system in order to prepare new control tables.

One countermeasure for the above problem is to provide one thousand control tables for hardware modules. With this method, it is possible to easily respond to a request for addition of hardware modules without interrupting the operation of the system because a sufficient number of control tables are provided in advance.

However, as one problem, it is necessary to provide a very large capacity storage in order to provide a sufficient number of control tables. Particularly, in a fault tolerant multiprocessor system, since it is necessary to provide the large capacity storage for the fault tolerance function, it is difficult to provide sufficient storage for use of the control tables.

As another problem, the processor overhead is increased because the processor module must check all control tables including those for unused hardware modules.

As still another problem, since the frame to be added is not known previously, it is difficult to prepare the control tables in advance.

According to the present invention, it is possible to provide a data processing system which can dynamically add hardware modules without interrupting the operation of the system.

SUMMARY OF THE INVENTION

The object of the present invention is to provide a data processing system which can dynamically add hardware modules without interrupting the operation of the system.

In accordance with the present invention, there is provided a data processing system formed by one or more kinds of hardware modules, such as processor modules, magnetic disk apparatuses, networks, and so forth, connected through a system bus, and additional hardware modules being added by connecting a frame containing one or more hardware modules to be added in accordance with a request of a user. Each of the processor modules includes:

a detection unit for detecting the request of addition of the frame containing the hardware modules to be added;

a specifying unit operatively connected to the detection unit for specifying a structure of hardware modules to be added when detecting the request;

an addition unit operatively connected to the specifying unit for preparing new control tables for the hardware modules to be added based on the structure information in the specifying unit, and dynamically adding the new control tables to the present control tables which are already provided for the present hardware modules; and an initializing unit operatively connected to the specifying unit for initializing the hardware modules to be added.

In a preferred embodiment, the addition unit prepares further control tables when there are unused hardware modules in the frame.

In another preferred embodiment, the addition unit and initializing unit are provided corresponding to the kind of hardware module, and these units are executed in accordance with the kind of hardware module specified by the specifying unit.

In still another preferred embodiment, a data processing system further comprises a saving memory unit operatively connected to the addition unit for saving relevant information on the hardware modules.

In still another preferred embodiment, the addition unit, initializing unit and saving memory unit are provided corresponding to the kind of hardware module, and these units are executed in accordance with the kind of hardware module specified by the specifying unit.

In still another preferred embodiment, the addition unit chains the new control tables to the present control tables in order to dynamically add the new prepared control tables to the present control tables of the hardware modules which are now operating.

In still another preferred embodiment, the addition unit copies the present control tables during operation and couples the new control tables to the copied control table in order to dynamically add the new prepared control tables to the present control table of the hardware modules which are now operating.

In still another preferred embodiment, the initializing unit initializes the hardware modules in parallel when there are a plurality of hardware modules to be initialized.

DESCRIPTION OF THE PREFERRED EMBODIMENTS

The preferred embodiments according to the present invention will now be explained in detail with reference to the drawings.

Figure 1:
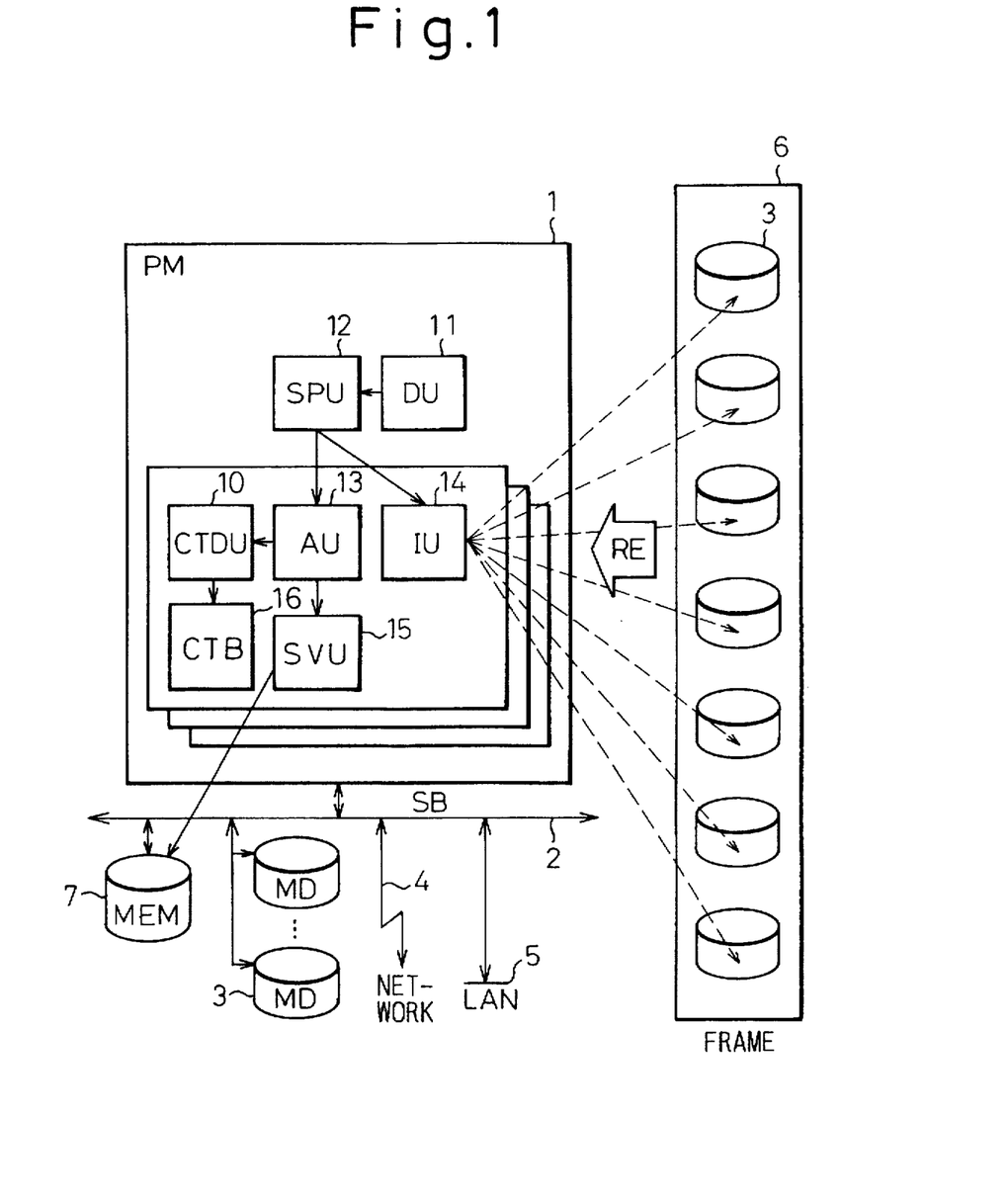
FIG. 1 is a basic structure of a data processing system according to the present invention.

FIG. 1 is a basic structure of a data processing system according to the present invention. Reference number 1 denotes a processor module (PM). Reference number 2 denotes a system bus (SB). Reference number 3 denotes one or more magnetic disk apparatuses (MD) connected to the processor module 1 through the system bus 2. Reference number 4 denotes one or more networks (NET) connected to the processor module 1 through the system bus 2. Reference number 5 denotes one or more local area networks (LAN) connected to the processor module 1 through the system bus 2. These components 3 to 5 are called "hardware modules" in this specification.

Reference number 6 denotes a frame which contains hardware modules to be added, for example, a plurality of magnetic disk apparatuses 3. This frame 6 is provided when the user intends to add additional hardware modules. Reference number 7 denotes a common memory (MEM) connected to the processor module 1 through the system bus 2, and is used for storing recovery information in order to recover the system when it crashes.

As is obvious from the above explanation, the hardware modules, such as the magnetic disk apparatuses 3, the network 4, and the LAN 5 are already provided in the initial system. The frame 6 can contain, for example, a plurality of magnetic disk apparatuses 3 as the hardware modules to be added. That is, a plurality of present magnetic disk apparatuses 3 are already provided in the initial system connected through the system bus 2, and a plurality of magnetic disk apparatuses 3 to be added are connected to the processor module 1 in order to expand the system in accordance with a request from a user without interrupting the operation of the system (i.e., dynamic expansion). In this case, a request for expansion (RE) is sent to the processor module 1 by the user using a predetermined command or is sent automatically from the frame using an interrupt.

The processor module 1 includes: a control table developing unit (CTDU) 10 for developing control tables of hardware modules which are now operating, and provided in corresponding with kinds of hardware modules; a detection unit (DU) 11 for detecting the request of addition of the frame 6 during operation of the system; a specifying unit (SPU) 12 for specifying the hardware modules to be added; an addition unit (AU) 13 for preparing the control tables of hardware modules to be added, and dynamically adding the control tables to the current control tables; an initializing unit (IU) 14 for initializing the hardware modules to be added; a saving memory unit (SVU) 15 for storing relevant (recovery) information to be saved regarding the hardware modules to be added into the common memory 7; and a memory (CTB) 16 for storing control tables.

The addition unit 13, the initializing unit 14, and the saving memory unit 15 are provided for all kinds of hardware modules. That is, these components 13 to 15 are provided separately for the magnetic disk apparatus 3, the network 4 and the LAN 5, respectively. The specifying unit 12 operates in accordance with hardware modules provided in the frame 6.

The operation of the present invention is briefly explained below.

When the detection unit 11 detects a request for addition of the frame 6 from the user during operation of the system, the specifying unit 12 specifies the frame 6 to be added based on information regarding the frame 6 before and after detection.

When the frame 6 to be added is specified in the specifying unit 12, the initializing unit 14 initializes the hardware modules contained in the frame 6. When there are a plurality of hardware modules in the frame 6, preferably, these hardware modules are initialized in parallel (i.e., simultaneously).

The addition unit 13, detects the structure information of the initialized hardware modules contained in the frame 6, prepares the control tables, and prepares further control tables indicating the use state of the hardware modules. Further, the addition unit 13 dynamically adds these control tables to the control tables which are developed in the control table developing unit 10.

Figure 5A:
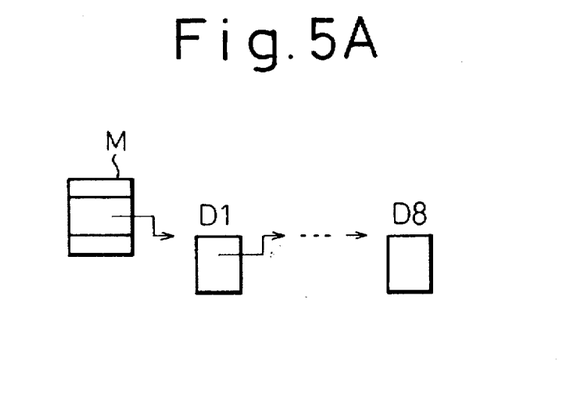
FIGS. 5A to 5C are explanatory views for explaining control tables connected in chaining state according to the present invention.
Figure 5B:
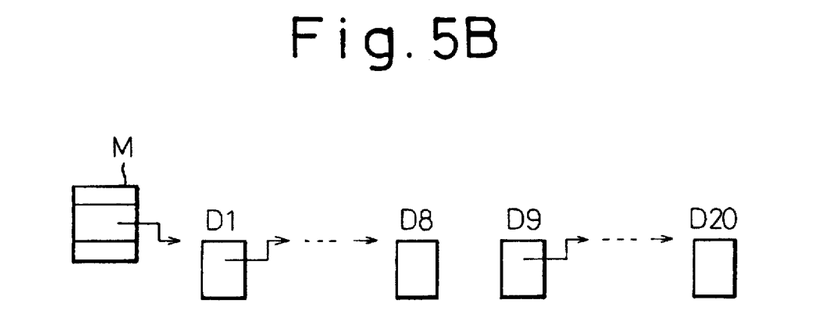
Figure 5C:
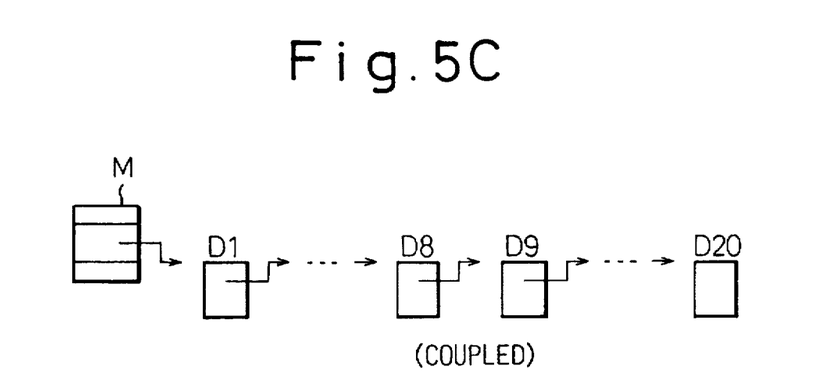

According to these processes, it is possible to add hardware modules without interrupting operation. For example, the control tables during operation are managed by chaining (i.e., control tables are coupled in series as shown in FIGS. 5A to 5C), the addition unit 13 dynamically connects the newly prepared control table to the current control table by chaining.

Figure 6A:
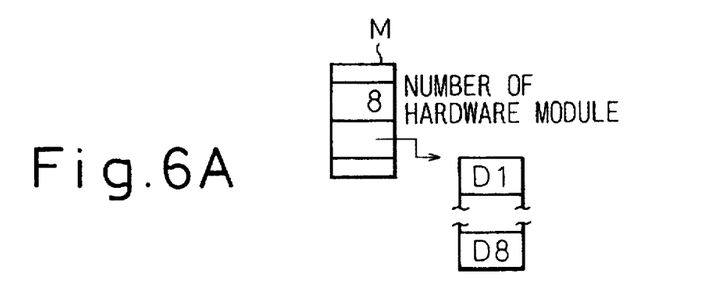
FIGS. 6A to 6C are explanatory views for explaining control tables managed by one area according to the present invention.
Figure 6B:
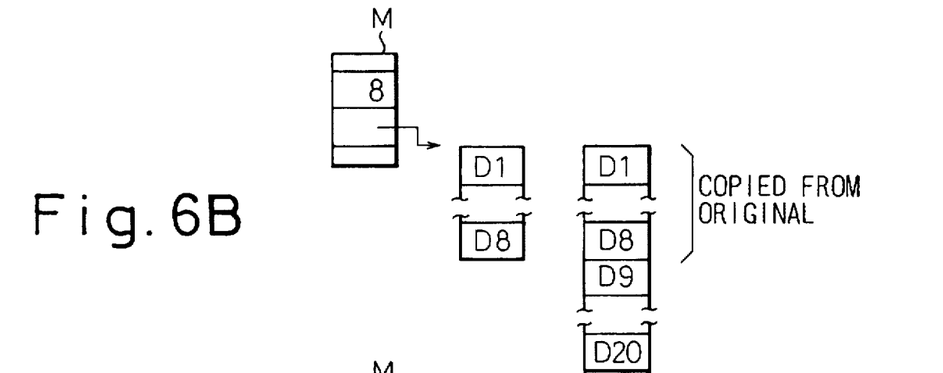
Figure 6C:
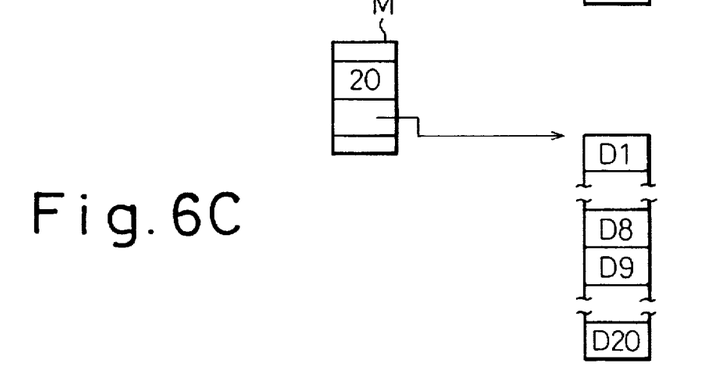

On the other hand, when the control tables are managed by areas (i.e., not connected by chaining and connected by lists) as shown in FIGS. 6A to 6C, the addition unit 13 copies the control tables which are now operating, and connects the prepared control tables to the copied tables.

The saving memory unit 15 saves the structure information of the hardware modules into the common memory 7 as a countermeasure in the event of a system crash occurring.

Figure 2:
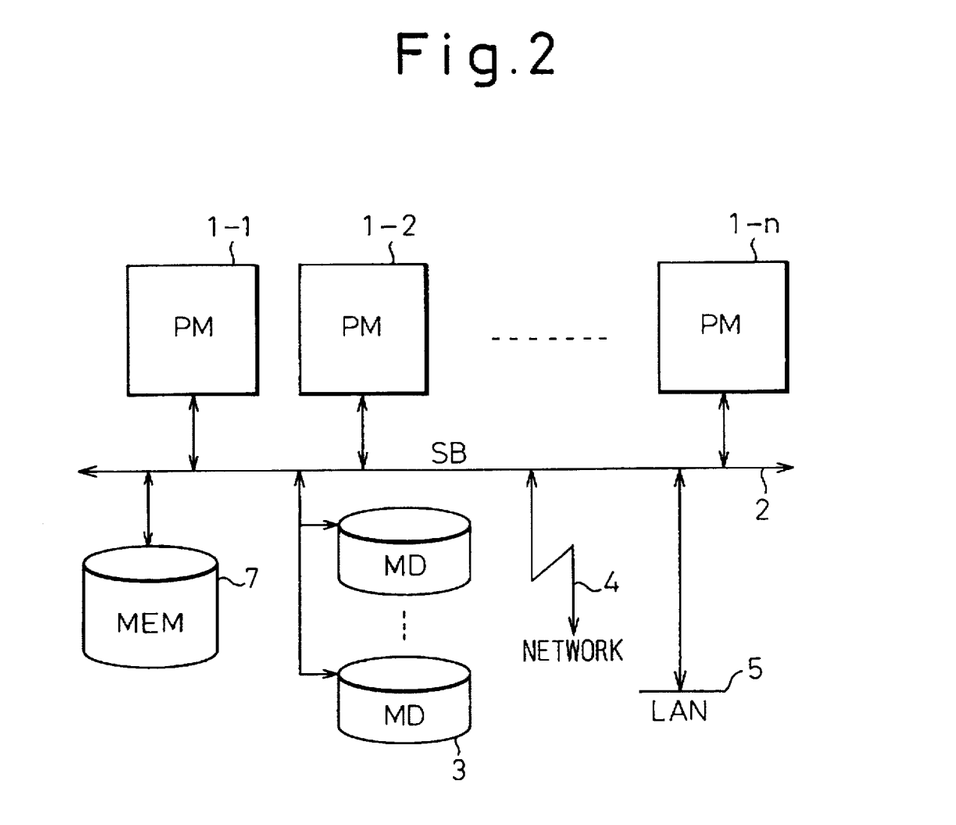
FIG. 2 is a schematic block diagram of a data processing system using the present invention.

FIG. 2 is a schematic block diagram of a data processing system using the present invention. Reference numbers 1-1 to 1-n denote processor modules (PMs). A data processing system is formed by a plurality of processor modules 1-1 to 1-n. The same reference numbers used in FIG. 1 are attached to the same components in this drawing. In this system, each processor module can include the dynamic expansion function of the present invention.

Figure 3:
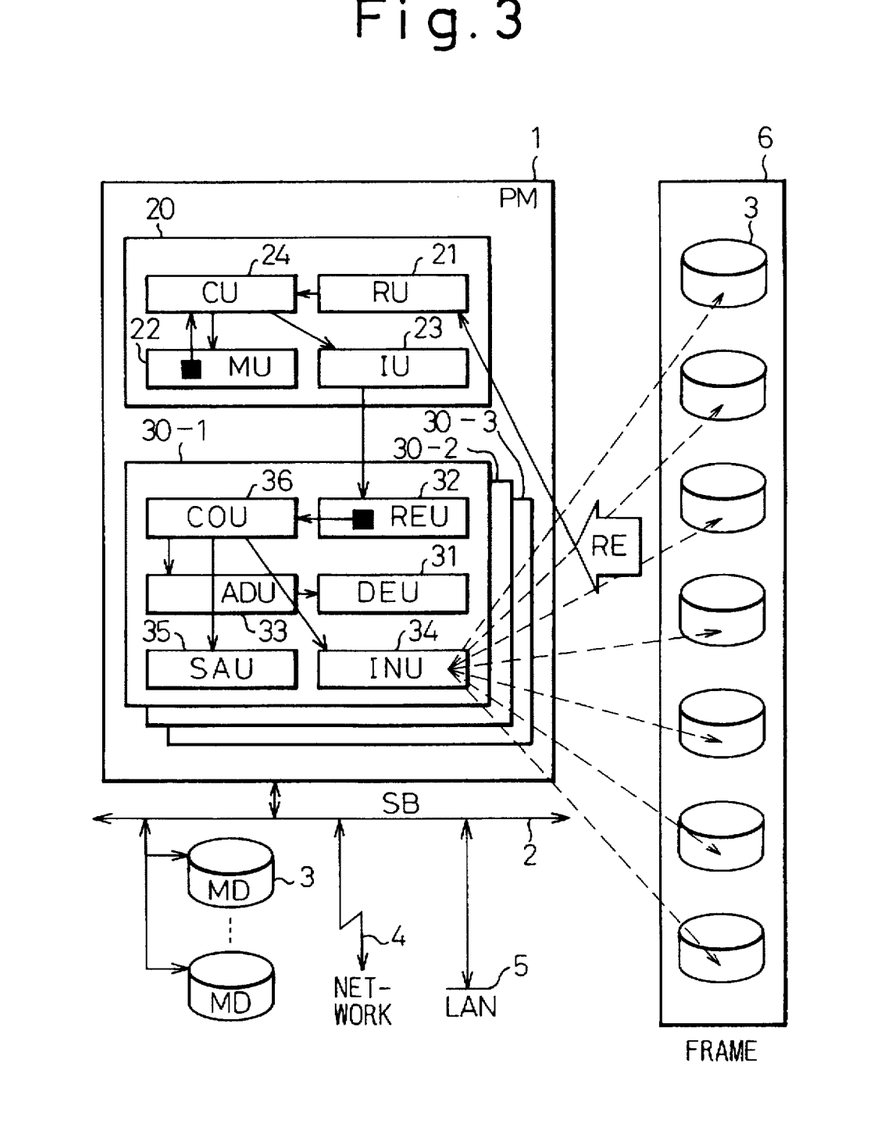
FIG. 3 is a detailed block diagram of a processor module shown in FIG. 1.

FIG. 3 is a detailed block diagram of a processor module shown in FIG. 1. The same reference numbers as used in FIG. 1 are attached to the same components in this drawing. As explained above, the hardware modules to be added, for example, magnetic disk apparatus, network or LAN, are contained in the frame 6.

The processor module 1 includes a hardware system structure controlling section 20 (below, main control section) for controlling all hardware modules in the system. Further, in this embodiment, the processor module 1 includes a hardware module control section 30. The hardware control section 30 is provided for all kinds of hardware modules. That is, the hardware module control section 30-1 is provided for the magnetic disk for managing the magnetic disk apparatus 3 (below, a first control section); the hardware module control section 30-2 is provided for the network for managing the network 4 (below, second control section); and the hardware module control section 30-3 is provided for the LAN (below, third control section).

The main control section 20 includes a recognition unit (RU) 21, a management unit (MU) 22, an information unit (IU) 23 and a control unit (CU) 24.

The recognition unit 21 receives and recognizes the request for addition of the frame 6. The management unit 22 manages information of the frame 6 (addresses and kinds of hardware modules) before expansion, and detects difference of the frame before and after expansion (i.e., difference information marked by a black mark in the management unit 22 and the reception unit 32). The information unit 23 sends information of the frame 6 to the hardware module control section 30-i (i=1 to 3). The system control unit 24 controls operations of all units in the hardware system control section 20.

Each of first, second and third control sections 30-1, 30-2, and 30-3 includes a development unit (DEU) 31, a reception unit (REU) 32, an addition unit (ADU) 33, an initializing unit (INU) 34, a saving unit (SAU) 35, and a control unit (COU) 36. Further, although not shown in this drawing, the memory (CTB) 16 storing control tables of FIG. 1 is provided in the hardware module control section 30.

The development unit 31 develops control tables of the hardware modules which are currently operating. The reception unit 32 receives information of the frame 6 which is sent from the hardware system control section 20. The addition unit 33 executes dynamic addition of hardware modules which are requested. The initializing unit 34 executes an initialization process of the hardware modules which are requested. The saving unit 35 saves relevant information for the hardware module in the common memory 7. The control unit 36 controls operations of all units in the hardware control section 30.

Figure 4:
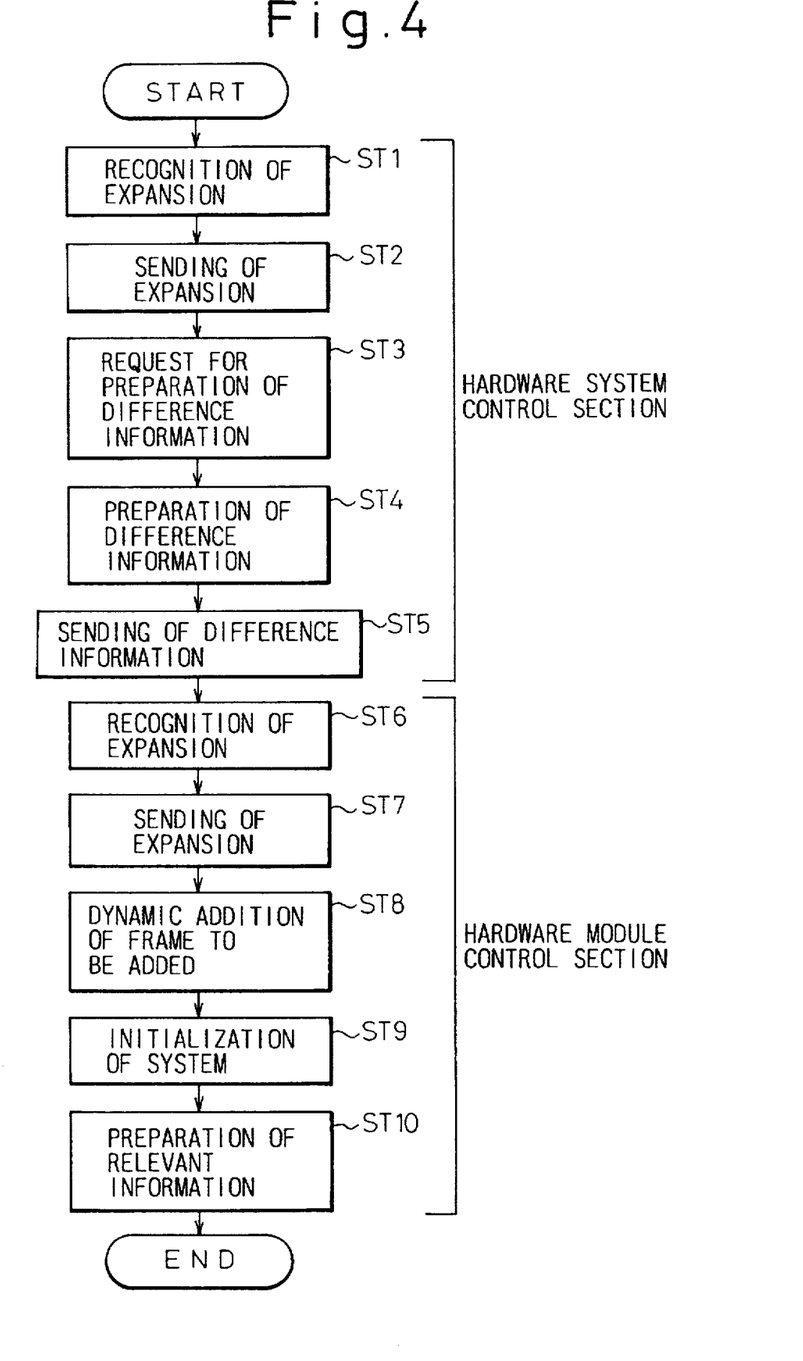
FIG. 4 is a flowchart in the processor module according to the present invention.

FIG. 4 is a flowchart of the processor module operation according to the present invention. For example, when the frame 6, which contains magnetic disk apparatuses 3 to be added, is connected to the processor module 1, the processor module 1 executes the steps shown in this flowchart so that it is possible to dynamically add magnetic disk apparatuses 3 for expansion as explained below. In the flowchart, steps ST1 to ST5 are executed in the hardware system control section (i.e., main control section) 20 of FIG. 3 by using software, and steps ST6 to ST10 are executed in the hardware module control section (i.e., first/second/third control section) 30 by using hardware.

In step ST1, the recognition unit 21 (see, FIG. 3) recognizes a request for expansion by the addition of frame 6 in response to a command from the user or an asynchronous interrupt from the hardware module.

In step ST2, after the recognition unit 21 recognizes the request for expansion, it sends information for addition of the frame 6 to the system control unit 24.

In step ST3, when the system control unit 24 receives this information from the recognition unit 21, the system control unit 24 requests preparation of the frame information, i.e., information of the difference for the frame (hardware module to be added) before and after expansion.

In step ST4, when the management unit 22 receives the request from the system control unit 24, the management unit 22 prepares difference information of the frame 6 before and after expansion. Further, the management unit 22 detects addresses and kinds of hardware modules which are contained in the frame 6, and sends the detected addresses and kinds of hardware modules to the system control unit 24. As is obvious, the magnetic disk apparatus is detected as the kind of the hardware module in this embodiment.

In step ST5, when the system control unit 24 receives the information from the management unit 22, the system control unit 24 sends the frame information, i.e., the difference information of the frame 6 before and after expansion to the reception unit 32 of the first control unit 30-1 using the information unit 23.

In step ST6, when the reception unit 32 receives the information from the system control unit 24, the reception unit 32 recognizes expansion of the frame 6.

In step ST7, the reception unit 32 sends the information of the frame 6 to the module control unit 36.

In step ST8, the module control unit 36 couples the frame 6 to be added with the processor module 1 using the dynamic addition unit 33 without interrupting operation.

In the addition process which dynamically adds the frame to be added into the processor module as explained above (dynamic addition process), the control tables of the magnetic disk apparatus in the frame 6 are dynamically coupled to the control tables of the present magnetic disk apparatus which are now developed in the development unit 31. Concretely, entries of the control table, which contain addresses, are prepared in step ST8.

In step ST9, the control unit 36 in the hardware module control section 30-1 initializes the magnetic disk apparatuses in the frame 6 (i.e., expanded magnetic disk apparatuses) in parallel to the present magnetic disk apparatus 3 using the initializing unit 34. This means that, when the present magnetic disk apparatuses 3 are initialized, the expanded magnetic disk apparatuses are also initialized (i.e. simultaneously initialized) in parallel to the present magnetic disk apparatuses 3.

After these initialization processes, the dynamic addition unit 33 reads various information of the expanded magnetic disk apparatuses, i.e., characteristics, name of volume, states, and like, and registers these information into entries of the control tables.

FIGS. 5A to 5C are explanatory views for explaining control tables connected in the chaining state according to the present invention. The control tables are provided in the memory 16 shown in FIG. 1. In FIG. 5A, a main table M is used for managing connection of control tables as explained in detail in FIG. 7. The eight control tables (D1 to D8), which are provided for the present magnetic disk modules, are managed by a main table M in chaining state. In FIG. 5B, D9 to D20 show control tables indicating hardware modules to be added. In accordance with the information of the frame to be added which are sent from the hardware system control section 20, the control tables which correspond to the number of the magnetic disk apparatuses (twelve in this embodiment) are prepared and coupled in the chaining state. This process corresponds to the step ST8.

In FIG. 5C, as explained in step ST9, the control tables D9 to D20 are coupled to the present control tables D1 to D8 between the control table D8 and D9. In this case, the control tables are prepared in such a way that the detection unit 31 detects information of state/hardware characteristics/volume name for the magnetic disk apparatus and registers them in the reception unit 32 regarding entries in which the magnetic disk apparatuses are connected in actual, and registers the fact regarding entries in which the magnetic disk apparatuses are not connected in actual.

FIGS. 6A to 6C are explanatory views for explaining control tables managed by one area according to the present invention. The control tables are provided in the memory 16 shown in FIG. 1. In FIG. 6A, the control tables of the present eight magnetic disk apparatuses 3 are managed collectively by the area A1 which includes control tables D1 to D8. In FIG. 6B, as explained in step ST8, first, an area A2 is prepared for control tables corresponding to a sum of the present magnetic disk apparatuses (D1 to D8) and the expanded magnetic disk apparatuses (D9 to D20). In this case, the control tables D1 to D8 are copied from the original area A1.

In FIG. 6C, as explained in step ST9, the control tables D1 to D20 are prepared in such a way that the detection unit 31 detects state/hardware characteristics/volume name of the magnetic disk apparatus and registers in the reception unit 32 regarding entries in which the magnetic disk apparatuses are connected in actual, and registers the fact regarding entries in which the magnetic disk apparatuses are not connected in actual.

As explained above, in steps ST8 and ST9, the dynamic addition unit 33 of the hardware module control section 30-1 can incorporate the magnetic disk apparatuses 3, which are contained within the frame 6, into the system without interrupting the present magnetic disk apparatuses 3.

Further, in step ST10, the module control unit 36 of the hardware module control section 30-1 prepares the relevant information of the magnetic disk apparatuses using the saving unit 35, and saves the relevant information to be saved into the common memory 7.

In the saving process of the relevant information, the relevant information for the magnetic disk apparatuses to be expanded are added to the relevant information of the present magnetic disk apparatus which are saved into the common memory 7 in order not to suppress a memory area of the common memory 7. That is, first, the relevant information for the magnetic disk apparatuses to be expanded are prepared in advance, and such relevant information are saved (accumulated) sequentially in the common memory 7.

In the relevant information for the magnetic disk apparatuses to be expanded, when the high speed recovery process for the relevant information is required, the information which are registered in the control table (address/hardware characteristics/volume name) are used. While, when the high speed recovery process is not required, the information of the frame to be expanded (address/kind of hardware), which are sent from the hardware system control section 20, can be used. Further, when the memory capacities of the saving area are not enough for the relevant information which are stored in the common memory 7, the saving areas are enlarged prior to provide the frame 6.

Figure 7:
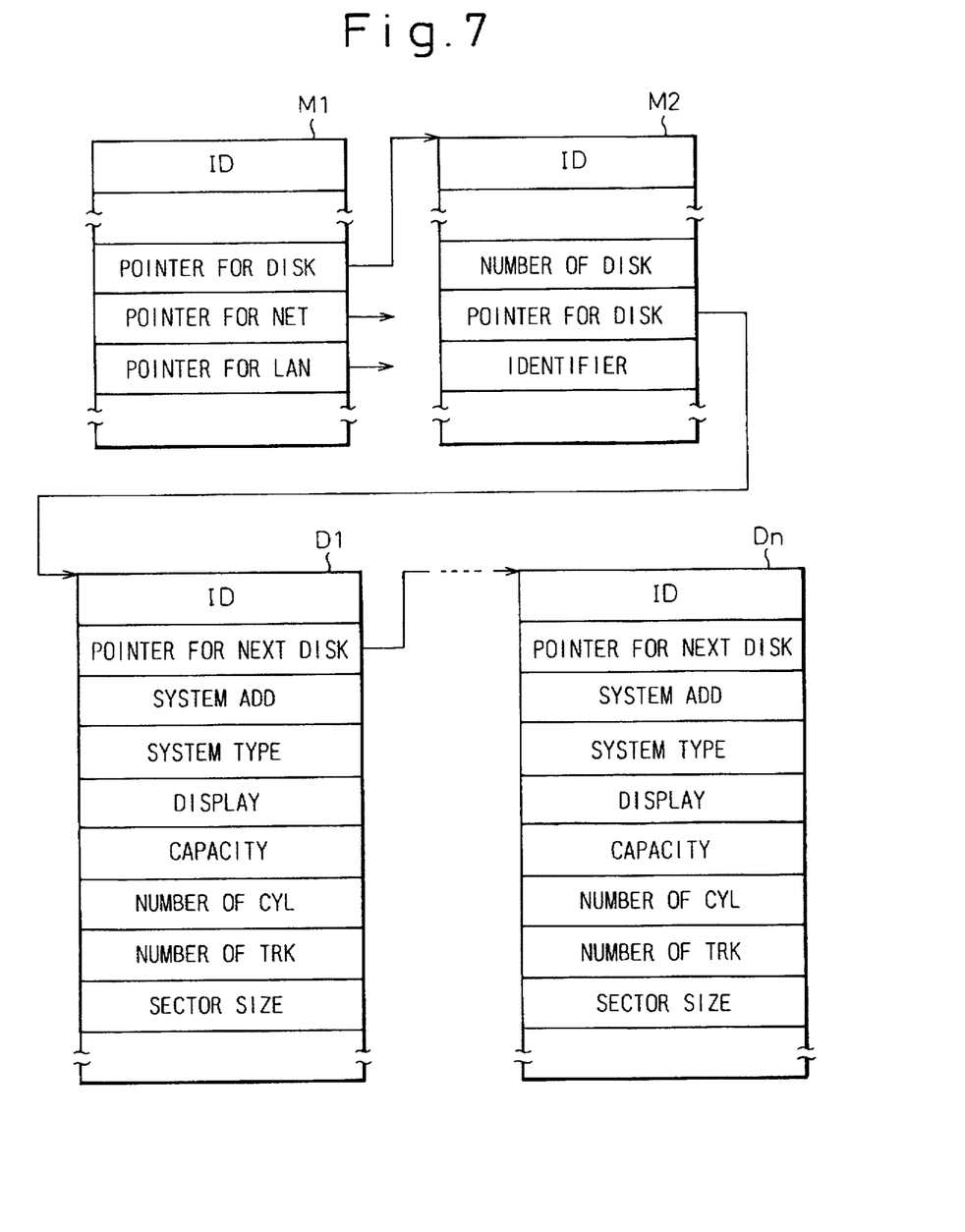
FIG. 7 shows details of the control tables shown in FIGS. 5A to 5C.

FIG. 7 shows a detailed control table shown in FIGS. 5A to 5C, and FIG. 8 shows a detailed control table shown in FIGS. 6A to 6C.

In FIG. 7, connection of the control table is performed by a pointer, and all control tables are connected in the chaining state as well as FIGS. 5A to 5C. A basic control table M1 is basically formed by an identification ID, a basic control table pointer for the disk (POINTER FOR DISK), a basic control table pointer for the network (POINTER FOR NET), a basic control table for the LAN (POINTER FOR LAN) and the like. For example, a basic control table pointer for the disk is selected when the magnetic disk apparatuses are enlarged. A basic control table for the disk M2 is basically formed by an identification ID, the number of disk (n), a control pointer for the disk (POINTER FOR DISK), an identifier for the common memory access (IDENTIFIER), and the like.

Further, a control table for the disk D1 to Dn is formed by an identification ID, a control table pointer for the next disk (POINTER FOR NEXT DISK), a system address (SYSTEM ADD), a system type (SYSTEM TYPE), a display of state (DISPLAY), a capacity (CAPACITY), the number of cylinders (NUMBER OF CYL), the number of tracks (NUMBER OF TRK), a sector size (SECTOR SIZE), and the like.

Figure 8:
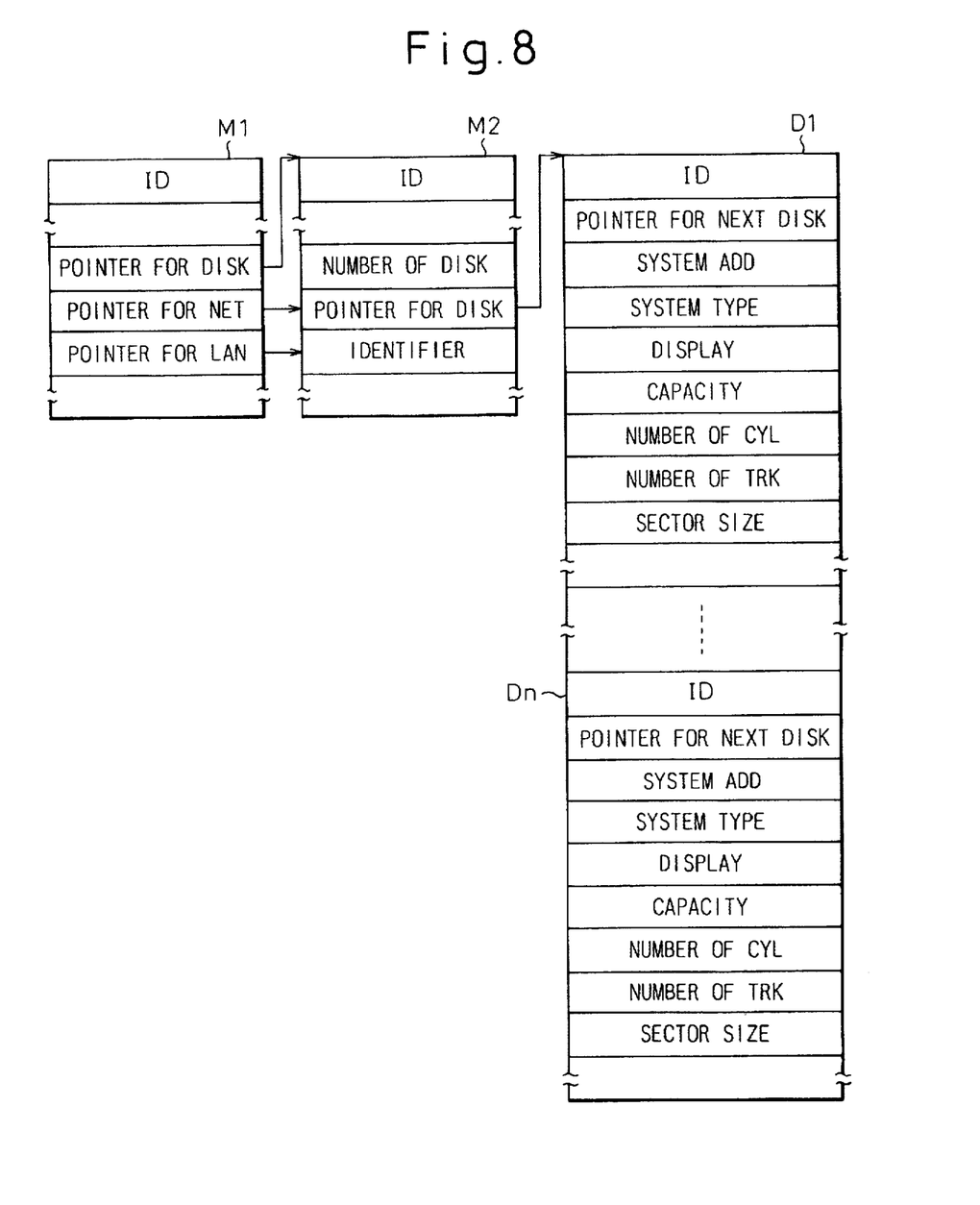
FIG. 8 shows details of the control tables shown in FIGS. 6A to 6C.

In FIG. 8, all control tables M1, M2, and D1 to Dn have the same structure as that of FIG. 7. The connection of the control table is performed by the pointer, and all control tables are listed in the same area as well as FIGS. 6A to 6C. Accordingly, the detailed explanations are omitted.

I claim:

1. A data processing system formed by one or more kinds of hardware modules, such as processor modules, magnetic disk apparatuses, networks, and so forth, connected through a system bus, and additional hardware modules being added by connecting a frame containing one or more hardware modules to be added in accordance with a request of a user, each of said processor modules comprising:

a detection means for detecting the request of addition of the frame containing the hardware modules to be added;

a specifying means operatively connected to the detection means for specifying a structure of hardware modules to be added when detecting the request;

an addition means operatively connected to the specifying means for preparing new control tables for the hardware modules to be added based on the structure information in the specifying means, and dynamically adding the new control tables to the present control tables which are already provided for the present hardware modules; and an initializing means operatively connected to the specifying means for initializing the hardware modules to be added.

2. A data processing system as claimed in claim 1, wherein said addition means prepares further control tables when there are unused hardware modules in the frame.

3. A data processing system as claimed in claim 1, wherein said addition means and initializing means are provided corresponding to the kind of hardware module, and these means being executed in accordance with the kind of hardware module specified by the specifying means.

4. A data processing system as claimed in claim 1, further comprising a saving memory means operatively connected to the addition means for saving relevant information on the hardware modules.

5. A data processing system as claimed in claim 1, wherein said addition means, initializing means and saving memory means are provided corresponding to the kind of hardware module, and these means being executed in accordance with the kind of hardware module specified by the specifying means.

6. A data processing system as claimed in claim 1, wherein said addition means couples the new control tables to the present control tables in chaining state in order to dynamically add the new prepared control tables to the present control tables of the hardware modules which are now operating.

7. A data processing system as claimed in claim 1, wherein said addition means copies the present control tables during operation and couples the new control tables to the copied control table in order to dynamically add the new prepared control tables to the present control table of the hardware modules which are now operating.

8. A data processing system as claimed in claim 1, wherein said initializing means initializes the hardware modules in parallel when there are a plurality of the hardware modules to be initialized.

9. A data processing system formed by one or more kinds of hardware modules, such as processor modules, magnetic disk apparatuses, networks, and so forth, connected through a system bus, and additional hardware modules being added by connecting a frame containing one or more hardware modules to be added in accordance with a request of a user, each of said processor modules comprising:

a detection unit detecting the request for addition of the frame containing the hardware modules to be added;

a specifying unit operatively connected to the detection unit and specifying a structure of hardware modules to be added when detecting the request;

an addition unit operatively connected to the specifying unit, preparing new control tables for the hardware modules to be added based on the structure information in the specifying unit, and dynamically adding the new control tables to present control tables which are already provided for the present hardware modules; and an initializing unit operatively connected to the specifying unit and initializing the hardware modules to be added.

10. A configuration manager for a computer system, comprising:

a detection module detecting a request from a user to add additional hardware modules to the computer system;

an insertion module collecting information on the additional hardware modules and preparing new control tables for the additional hardware modules based on the collected information and adding the new control tables to present control tables, the control tables being connected via a dynamically expandable data structure.

* * * * *